US010000153B1

(12) United States Patent
Misu (10) Patent No.: US 10,000,153 B1
(45) Date of Patent: Jun. 19, 2018

(54) SYSTEM FOR OBJECT INDICATION ON A VEHICLE DISPLAY AND METHOD THEREOF

(71) Applicant: HONDA MOTOR CO., LTD., Minato-ku, Tokyo (JP)

(72) Inventor: Teruhisa Misu, Mountain View, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days. days.

(21) Appl. No.: 15/693,116

(22) Filed: Aug. 31, 2017

(51) Int. Cl.
| B60Q 1/00 | (2006.01) |
| B60Q 9/00 | (2006.01) |
| G06K 9/00 | (2006.01) |
| G06T 11/60 | (2006.01) |
| B60R 1/00 | (2006.01) |

(52) U.S. Cl.
CPC ............... *B60Q 9/008* (2013.01); *B60R 1/00* (2013.01); *G06K 9/00798* (2013.01); *G06K 9/00805* (2013.01); *G06T 11/60* (2013.01); *B60R 2300/205* (2013.01); *B60R 2300/301* (2013.01); *B60R 2300/8093* (2013.01)

(58) Field of Classification Search
CPC ..... B60Q 9/008; B60R 1/00; B60R 2300/205; B60R 2300/301; B60R 2300/8093; G06K 9/00798; G06K 9/00805; G06T 11/60
USPC ........................................................ 340/435
See application file for complete search history.

(56) References Cited

U.S. PATENT DOCUMENTS

| 8,217,773 | B2 | 7/2012 | Matsumoto et al. |
| 8,395,529 | B2 | 3/2013 | Seder et al. |
| 8,810,381 | B2 | 8/2014 | Fong et al. |
| 9,715,752 | B2* | 7/2017 | Hosoda .................. G06T 11/60 |
| 2005/0134479 | A1* | 6/2005 | Isaji ...................... G08G 1/0969 340/901 |
| 2005/0259033 | A1 | 11/2005 | Levine |
| 2007/0005609 | A1* | 1/2007 | Breed .................. B60N 2/2863 |
| 2012/0176497 | A1* | 7/2012 | Shadmi .................. G01C 21/00 348/144 |
| 2014/0278033 | A1* | 9/2014 | Scofield ................. G02B 27/01 701/118 |
| 2014/0362195 | A1* | 12/2014 | Ng-Thow-Hing . G06K 9/00791 348/51 |
| 2015/0210255 | A1* | 7/2015 | Fletcher .................... B60T 7/22 701/70 |
| 2016/0163108 | A1 | 6/2016 | Kim |
| 2016/0327953 | A1* | 11/2016 | Nilsson ............. B60W 50/0097 |
| 2017/0213376 | A1* | 7/2017 | Li ............................ G06T 11/60 |
| 2017/0301107 | A1* | 10/2017 | Sasaki ....................... G06T 7/70 |
| 2018/0017799 | A1* | 1/2018 | Ahmad ..................... B60R 1/00 |
| 2018/0058873 | A1* | 3/2018 | Huang ................. G01C 21/365 |

\* cited by examiner

*Primary Examiner* — Zhen Y Wu (74) *Attorney, Agent, or Firm* — Arent Fox LLP (57) ABSTRACT

Presence of an object can be indicated on a display of a vehicle. Multiple indicators can be displayed on the display of the vehicle, where each indicator corresponds to one of multiple portions of a drawing area associated with the display. Presence of the object can be detected within a travel direction of the vehicle. Location information of the object can be associated with one of the multiple portions of the drawing area. One of the multiple indicators that corresponds to the one of the multiple portions of the drawing area can be highlighted on the display as an alert of the presence of the object.

20 Claims, 5 Drawing Sheets

SYSTEM FOR OBJECT INDICATION ON A VEHICLE DISPLAY AND METHOD THEREOF

BACKGROUND

Vehicles can be equipped with displays, such as a heads-up display (HUD) that projects information onto a windshield of the vehicle, an infotainment display typically situated within a dash or console of the vehicle, etc. The displays can present information related to operating the vehicle, such as a speed of the vehicle, direction of the vehicle, navigation directions to assist a vehicle operator when driving the vehicle.

SUMMARY

The following presents a simplified summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an example, a method for indicating presence of an object on a display of a vehicle is provided. The method includes displaying multiple indicators on the display of the vehicle, where each indicator corresponds to one of multiple portions of a drawing area associated with the display, detecting presence of the object within a travel direction of the vehicle, associating location information of the object with one of the multiple portions of the drawing area, and highlighting, on the display of the vehicle, one of the multiple indicators that corresponds to the one of the multiple portions of the drawing area as an alert of the presence of the object.

In another example, a vehicle is provided that includes an electronic control unit for communicating with at least one vehicle system, a display for displaying multiple indicators, where each indicator corresponds to one of multiple portions of a drawing area associated with the display, and at least one processor. The at least one processor is configured to detect presence of an object within a travel direction of the vehicle, associate location information of the object with one of the multiple portions of the drawing area, and highlight, on the display of the vehicle, one of the multiple indicators that corresponds to the one of the multiple portions of the drawing area as an alert of the presence of the object.

In a further example, a non-transitory computer-readable medium storing computer executable code for indicating presence of an object on a display of a vehicle is provided. The code includes code for displaying multiple indicators on the display of the vehicle, where each indicator corresponds to one of multiple portions of a drawing area associated with the display. The code also includes code for detecting presence of the object within a travel direction of the vehicle, associating location information of the object with one of the multiple portions of the drawing area, and highlighting, on the display of the vehicle, one of the multiple indicators that corresponds to the one of the multiple portions of the drawing area as an alert of the presence of the object.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

The term "location," as used herein, can refer to a position of an object in space. A location can be indicated using a coordinate system. For example, a location can be represented as a longitude and latitude. In another aspect, a location can include a height. Moreover, in an example, the location can be relative to an object, such as a device detecting location of another device, and the location can be indicated based on the device detecting the location.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected," is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "vehicle," as used herein, can refer to any moving vehicle that is capable of carrying one or more human occupants and is powered by any form of energy. The term "vehicle" can include, but is not limited to: cars, trucks, vans, minivans, SUVs, motorcycles, scooters, boats, personal watercraft, and aircraft. In some cases, a motor vehicle includes one or more engines.

The term "vehicle operator," as used herein, can refer to an entity (e.g., a person or other being, robot or other mobile unit, etc.) that can operate a vehicle. The vehicle operator can carry a remote device or other mechanism for activating one or more vehicle systems or other components of the vehicle.

The term "vehicle system," as used herein, can refer to an electronically controlled system on a vehicle operable to perform certain actions on components of the vehicle, which can provide an interface to allow operation by another system or graphical user interaction. The vehicle systems can include, but are not limited to, vehicle ignition systems, vehicle heating, ventilating, and air conditioning (HVAC) systems, vehicle audio systems, vehicle security systems, vehicle video systems, vehicle infotainment systems, vehicle telephone systems, and the like.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Figure 1:
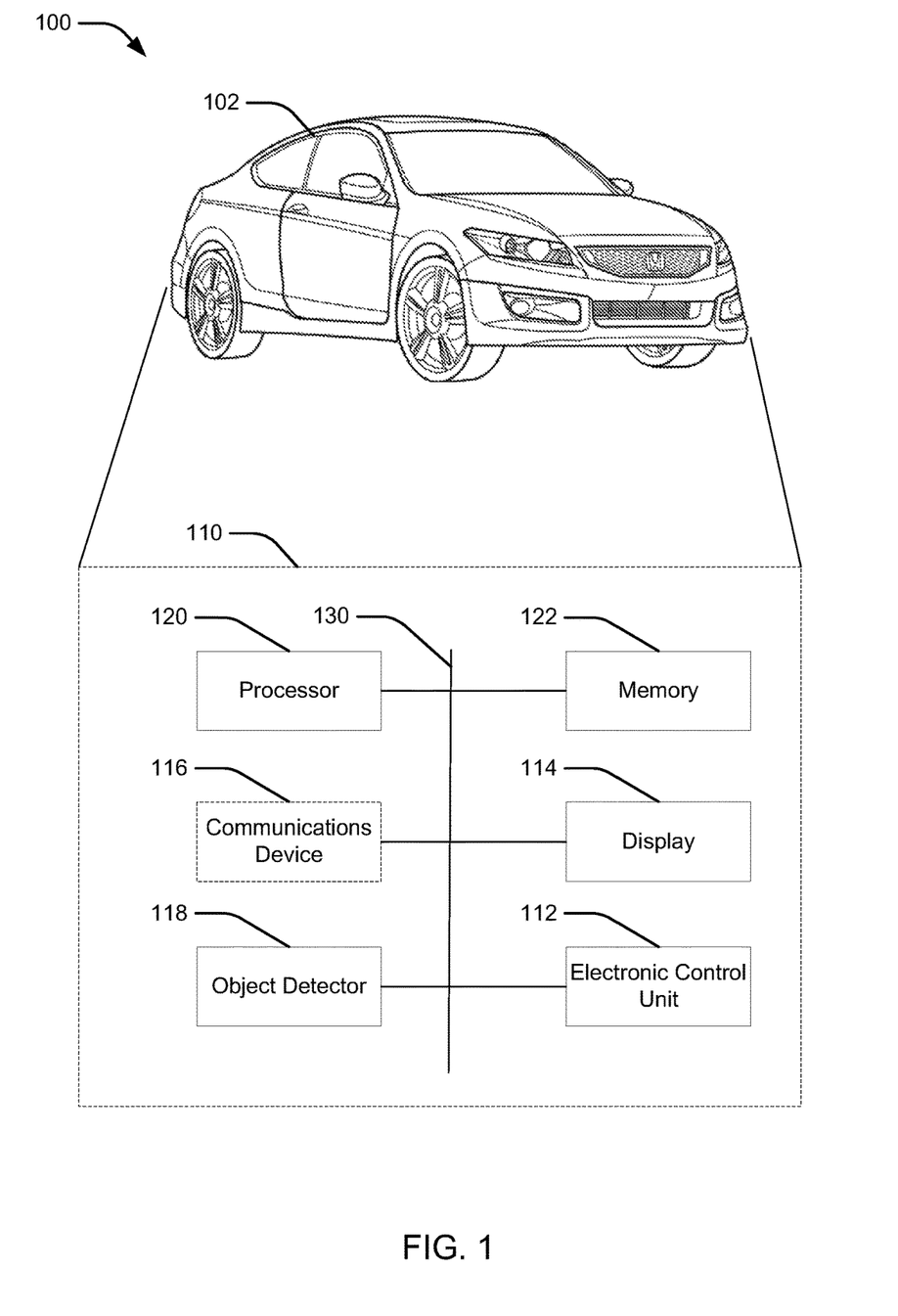
FIG. 1 illustrates a schematic view of an example operating environment of a vehicle display system according to one aspect of the disclosure.

FIG. 1 shows a schematic view of an example operating environment 100 of a vehicle display system 110 and example methods according to aspects described herein. For example, operating environment 100 can include a vehicle 102 within which the vehicle display system 110 can reside and function. Components of the vehicle display system 110, as well as the components of other systems, hardware architectures and software architectures discussed herein, can be combined, omitted or organized into different architectures for various aspects of the disclosure. However, the example aspects and configurations discussed herein focus on the operating environment 100 as illustrated in FIG. 1, with corresponding system components and related methods.

As shown in FIG. 1, a vehicle 102 can include or can be operably coupled with a vehicle display system 110, which can include a heads-up display (HUD) configured to project images on a windshield for viewing by a vehicle operator, an infotainment system configured to display information in a dash or console of the vehicle 102 for viewing by the vehicle operator, and/or the like. The vehicle display system 110 can include, or can be communicatively coupled with, an electronic control unit (ECU) 112 that operably controls a plurality of vehicle systems. The vehicle systems can include, but are not limited to, the vehicle display system 110, among others, including vehicle telematics systems that communicate data regarding operating the vehicle, such as vehicle speed, engine temperature, fuel level, vehicle health statistics, vehicle HVAC systems, vehicle audio systems, vehicle security systems, vehicle video systems, vehicle telephone systems, and the like. For example, ECU 112 can control and/or communicate with many electrical, mechanical, electromechanical aspects of the vehicle starting/shutting down of an ignition of the vehicle, operation of the HVAC system to circulate air in the vehicle, operation of door locks, windows and an audio system, among other functions, and/or can provide a graphical user or programmatic interface to allow operators or other devices (e.g., processor 120 executing functions described herein) to control such aspects of the vehicle 102.

The vehicle display system 110 can include, or be operably coupled with, a display 114, which can include a projector for emitting light corresponding to images for displaying on a windshield of the vehicle 102, a liquid crystal display (LCD) integrated in an infotainment system in the vehicle 102. The vehicle display system 110 can also include, or be operably coupled with, one or more communications devices 116 for communicating with one or more remote systems using an electronic communication technology (such as RFID, NFC, Bluetooth®, ZigBee®, etc.). The vehicle display system 110 can also include, or be operably coupled with, an object detector 118 that can detect presence of, distance or direction to one or more objects outside of the vehicle 102. For example, the object detector 118 can include an infrared or heat sensor, a radar device, a camera, etc. In another example, the object detector 118 can be coupled with an identification mechanism that can identify a detected object (e.g., based on a temperature of the object, an outline of the object, a detected movement or acceleration of the object, etc.). In an example, the object detector 118 can detect not only objects such as moving/living objects, but can also detect road features, such as a road surface, lane indicators (e.g., lines) on the road surface, buildings, vegetation, etc.

The vehicle display system 110 can also include or be operably coupled with (or executed by) one or more processors 120 and one or more memories 122 that communicate to effectuate certain actions at the vehicle 102 (e.g., actions on or associated with one or more of ECU 112, display 114, communications device(s) 116, object detector 118, and/or other components described herein). In one example, one or more of the ECU 112, display 114, communications device(s) 116, object detector 118, processor(s) 120 and/or memory(ies) 122 can be connected via one or more buses 130.

In addition, the ECU 112 can additionally or alternatively include a processor, memory (e.g., internal processing memory), an interface circuit, and/or buses for transferring data, sending commands, and communicating with the vehicle systems (not shown). In addition, communications device 116, as described, can include substantially any wireless device or related modem for providing wireless computer communications utilizing various protocols to send/receive electronic signals internally to features and systems within the vehicle 102 and/or to external devices. In an example, communications device 116 can communicate according to one or more wireless systems (e.g., RFID, IEEE 802.11, IEEE 802.15.1 (Bluetooth®)), NFC (e.g., ISO 13157), a local area network (LAN), and/or a point-to-point system, etc.).

Figure 2:
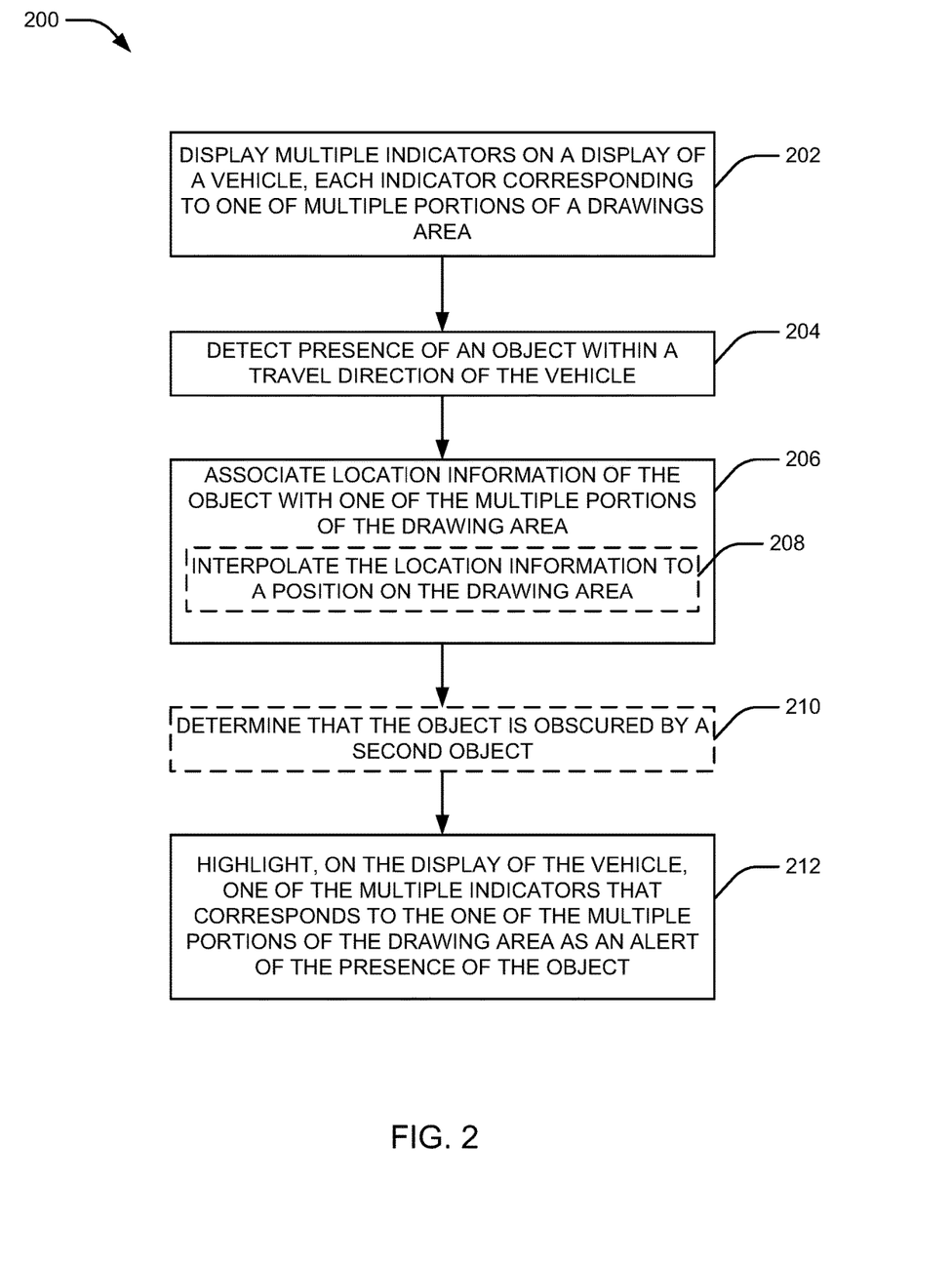
FIG. 2 illustrates a flowchart showing an example method for indicating presence of an object on a vehicle display according to one aspect of the disclosure.

Referring now to FIG. 2, an example method 200 that can be performed or utilized by the vehicle display system 110 to display indicators to indicate presence of one or more objects in a travel direction of the vehicle, is illustrated.

In block 202, the method 200 can include displaying multiple indicators on a display of a vehicle, each indicator corresponding to one of multiple portions of a drawing area. In an aspect, vehicle display system 110, e.g., in conjunction with display 114, processor 120, memory 122, can display the multiple indicators on the display of the vehicle (e.g., display 114), each indicator corresponding to one of multiple portions of the drawing area. In one example, vehicle display system 110 can display the indicators to be of substantially any shape, such as an ellipse, circle, square, rectangle, triangle and diamond, among other shapes. In addition, for example, vehicle display system 110 can display indicators in each of multiple portions of the display area where each portion can correspond to a region of the display 114 (e.g., and/or a corresponding area in front the vehicle as displayed on the display 114 or otherwise within the drawing area of the display 114). For example, a travel direction of the vehicle 102 can be oriented based on a front of the vehicle, and the indicators can be displayed within the drawing area, which is indicated the travel direction with respect to the front of the vehicle.

Figure 3:
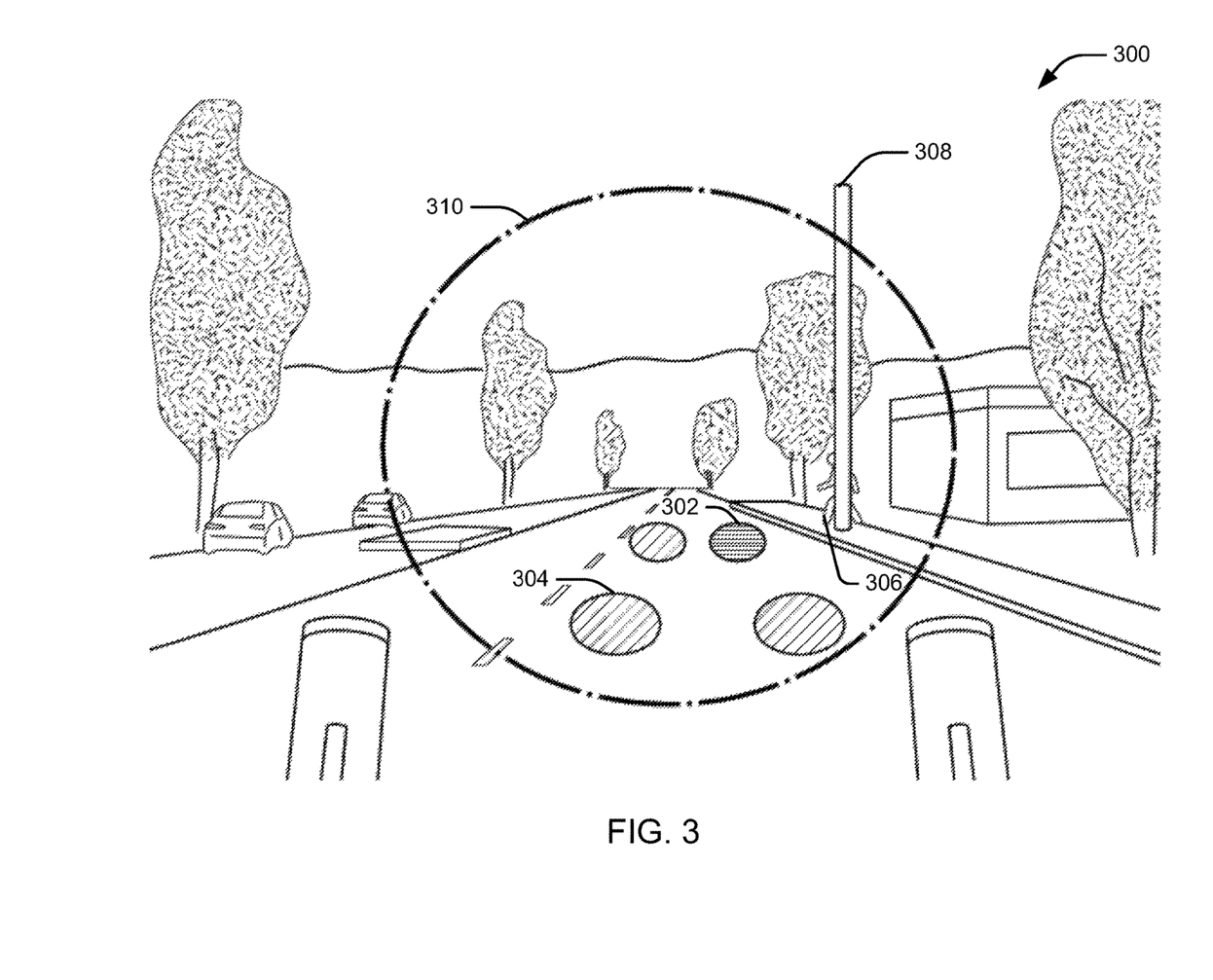
FIG. 3 illustrates a specific non-limiting example of a heads-up display indicating presence of an object according to one aspect of the disclosure.

An example is depicted in FIG. 3 where multiple indicators, such as indicator 302, 304, are displayed via the display 114 (e.g., based on projecting the indicators 302, 304, etc., in a heads-up display on a windshield 300), where the indicators can represent regions or portions of an area in the travel direction forward of the vehicle. In this example, the indicators include four indicators where each indicator is displayed in a quadrant corresponding to a lane of a road, and within a drawing area 310 of the display 114. Thus, for example, vehicle display system 110 can detect the lane and/or the road in the travel direction of the vehicle (e.g., based on object detector 118 detecting a surface of the road, lines on the road indicating an area of the lane, etc.), and can accordingly determine a corresponding lane area of the display 114, within the drawing area 310, on which to display the indicators 302, 304, etc. In one example, vehicle display system 110 can interpolate a position of the detected lane indicators, road surface, etc. onto a coordinate system used for the display 114 such to determine the lane area in the coordinate system corresponding to the lane indicators, road surface, etc., and can accordingly divide the lane area in the coordinate system into quadrants (not shown) for displaying an indicator in each quadrant (e.g., in a center of each quadrant).

Moreover, in an example, vehicle display system 110 can select a size of each of the indicators based on the size of the corresponding quadrant. For instance, based on perspective, the lane area determined to define the lane can be of a substantially triangular shape such that the quadrants near the top of the lane area (e.g., and thus further ahead in the travel direction of the vehicle 102) can have a smaller area than quadrants at the bottom of the lane area (e.g., nearer in the travel direction to the vehicle 102). In an example, the size of indicator 302 can be smaller than a size of indicator 304. This can also change where the lane curves ahead of the vehicle 102, and the quadrant sizes can accordingly be different based on a detected curved feature of the lane. Moreover, the indicators 302, 304, can be stretched, contorted, etc. based on the curved feature (e.g., the shape of the indicators 302, 304, can be convolved with the shape of the quadrant of the lane area). The vehicle display system 110 can determine the quadrants of the lane area based at least in part on locating a center point of the lane area, and dividing the lane area into four quadrants at the center point, which can be impacted by a curved feature in the lane (e.g., a line from the center point to the top of the lane area that defines a quadrant can curve as well based on the curved feature of the lane).

Furthermore, for example, vehicle display system 110 can determine the lane corresponding to the lane area to be the lane in which the vehicle 102 is traveling, which can be based on determining a location of the lane indicators (e.g., lines) with respect to the object detector 118. In this example, vehicle display system 110 can accordingly determine the lane for which to determine the lane area for displaying the indicators 302, 304 to be the lane in which the vehicle 102 is traveling. Thus, for example, where the vehicle 102 changes lanes, the object detector 108 can detect a different set of lane indicators (or the same lane indicators but on the other side of the vehicle), and vehicle display system 110 can accordingly determine a different lane area for interpolating the position and displaying the indicators 302, 304 on the display 114.

In another example, vehicle display system 110 can display the indicators 302, 304 at fixed locations on the display 114. In this example, the indicators 302, 304 can be configured to appear within the lane on the display 114 based on the vehicle driving within the lane.

In yet another example, vehicle display system 110 can display the indicators 302, 304 in the travel direction of the vehicle. In an aspect, vehicle display system 110, e.g., in conjunction with display 114, processor 120, memory 122 can stretch or contort the indicators 302, 304 where the travel direction of the vehicle changes (e.g., based on a rotational position (e.g., a yaw) of a steering column of the vehicle 102, a wheel of the vehicle 102), which can be determined based on information received from one or more ECUs 112 that communicates, senses, or otherwise determines such information from mechanical and/or electromechanical parts of the vehicle, etc.

At block 204, method 200 can also include detecting presence of an object within a travel direction of the vehicle. In an aspect, vehicle display system 110, e.g., in conjunction with one or more ECUs 112, object detector 118, processor 120, memory 122 can detect presence of the object within the travel direction of the vehicle. For example, the object detector 118 can include one or more sensors that can detect presence of objects, such as an infrared or heat sensor, optical sensor, radar, camera, as described, to detect presence of objects, which can include one or more of structural inanimate objects, animate objects, and can do so within a path of the vehicle 102 in its travel direction, where the path can correspond to an area in front of the vehicle that can be analyzed by the object detector 118 to detect objects. In one example, the path can correspond to, or at least include, a drawing area associated with the display 114 such that location information of detected objects can be interpolated onto the display 114 in the drawing area (e.g., based on interpolating the location information of detected objects, as detected by the object detector 118, to a coordinate space of the drawing area, as described further herein).

In an example, the object detector 118 can be configured to identify detected objects, or at least identify a type of the detected objects. For example, object detector 118 can be configured to determine a type of a detected object at a general level (e.g., animate or inanimate) or more specific identification (e.g., a sign, a tree, a road, a human, an animal or other living being, etc.). For example, the object detector 118 can be configured to differentiate between animate and inanimate objects. In one example, the vehicle display system 110 can utilize multiple sensors, and can determine an object type based on the sensor used to identify the objects (e.g., one type of sensor on the vehicle 102 can detect animate objects, such as an infrared or heat sensor, and another type of sensor on the vehicle 102 can detect inanimate objects, such as a radar or camera). In either case, in an example, the object detector 118 can also be configured to detect objects based at least in part on determining an outline profile of the objects, and/or using machine-learning (e.g., neural networks) to match the profile to a certain type of object, etc. The vehicle display system 110 can utilize the type of object to determine a function for highlighting an indicator on the display 114, as described further herein.

In an example, the object detector 118 can be associated with and/or calibrated with respect to, e.g., an area in front the vehicle to allow for determining location information of the detected object with respect to the front of the vehicle. For example, the location information can include a distance from the vehicle to a detected object, a direction of detected object from the vehicle (e.g., related to the distance), etc. In this regard, detecting the presence of the object can also include detecting the direction and/or distance from the vehicle 102 to the object or other location information of the object, which can be graphically represented on the display 114, as described further herein, based on interpolating the location information (e.g., the detected direction and/or distance) to a coordinate space for highlighting an indicator for the object on the display 114. Object detector 118, in a specific example, can detect a person 306, a pole 308 obscuring the person 306, etc.

At block 206, method 200 can also include associating location information of the object with one of the multiple portions of the drawing area. In an aspect, vehicle display system 110, e.g., in conjunction with one or more ECUs 112, object detector 118, processor 120, memory 122 can associate the location information of the object (e.g., person 306, pole 308, etc.) with the one of the multiple portions of the drawing area (e.g., drawing area 310). For example, the vehicle display system 110 can associate the location information of the object, such as a direction and/or distance to the object from the object detector 118, with a quadrant of a lane area, or other portion, determined for the drawing area 310. In one example, the vehicle display system 110 can determine a quadrant nearest to the detected object.

In one example, associating the location information of the object with the one of the multiple portions can optionally include, at block 208, interpolating the location information to a position on the drawing area. In an aspect, vehicle display system 110, e.g., in conjunction with one or more ECUs 112, object detector 118, processor 120, memory 122 can interpolate the location information or the object to a position on the drawing area (e.g., drawing area 310). For example, vehicle display system 110 can interpolate the location information to determine a corresponding location on a coordinate system defined for the drawing area 310 of the display 114. The vehicle display system 110 can accordingly determine the portion (e.g., quadrant) of the drawing area 310, which corresponds to a given indicator 302, 304, etc., that is closest to the object (e.g., closest to the determined location on the coordinate system of the drawing area 310), in associating the object with the portion of the drawing area 310.

In an example, optionally at block 210, method 200 can include determining that the object is obscured by a second object. In an aspect, vehicle display system 110, e.g., in conjunction with one or more ECUs 112, object detector 118, processor 120, memory 122 can determine that the object is obscured by a second object. For example, vehicle display system 110 can detect (e.g., via object detector 118) presence of the second object, which can include utilizing one or more sensors to detect the second object and/or corresponding location information (e.g., a direction and/or distance to the second object). Vehicle display system 110 can also determine that the second object is obscuring the first object based at least in part on the distance and/or direction to each of the first object and the second object. In one example, vehicle display system 110 can determine that at least the obscured object is an animate object (e.g., based on previously detecting the object at another position or otherwise detecting a movement or acceleration of the obscured object). In any case, in an example, the vehicle display system 110 can determine to highlight an indicator closest to the object, as described further herein, based on determining that the object is obscured by the other object.

At block 212, method 200 can also include highlighting, on the display of the vehicle, one of the multiple indicators that corresponds to the one of the multiple portions of the drawing area as an alert of the presence of the object. In an aspect, vehicle display system 110, e.g., in conjunction with one or more ECUs 112, object detector 118, processor 120, memory 122 can highlight, on the display 114 of the vehicle 102, one of the multiple indicators (e.g., indicators 302, 304) that corresponds to the one of the multiple portions of the drawing area (e.g., drawing area 310) as an alert of the presence of the object (e.g., the person 306, pole 308 obscuring the person 306, etc.). For example, vehicle display system 110 can highlight the indicator closest to the object. As described, the vehicle display system 110 can highlight the indicator based on detecting the object and/or detecting that the object is obscured by another object. In another example, the vehicle display system 110 can determine to highlight the indicator based additionally or alternatively on a detected acceleration associated with the object (e.g., based on detecting that the acceleration achieves a threshold).

In an example, vehicle display system 110 can highlight the indicator, such as indicator 302, using substantially any sort or style of highlighting to differentiate the indicator 302 from a non-highlighted indicators (e.g., indicator 304), including filling the indicator 302 with a different color than the other indicators, filling the indicator 302 with a different pattern, flashing the indicator 302, outlining the indicator 302, etc. In addition, as described further herein, the vehicle display system 110 can perform the highlighting based on a detected type or property of the object (e.g., a different color/pattern for a person or animal, a different color/pattern for an inanimate object, a different rate of flashing per object property/type, etc.). Additionally, for example, vehicle display system 110 can continue to detect presence of the object over a period of time (e.g., at a polling interval), and can update the highlighting status of the indicator 302, 304, and/or other indicators (e.g., as being highlighted or not highlighted) to highlight the appropriate indicator as the vehicle 102 can move with respect to the object and/or the object can move as well.

FIG. 3 illustrates an example of a display projected onto a windshield 300 by a vehicle display system 110, as described herein. In an example, the vehicle display system 110 can display the indicators 302, 304 which can include four indicators as shown, or substantially any number of indicators corresponding to a portion of a drawing area 310, within the drawing area 310. For example, the drawing area 310 can correspond to, or at least be included in, an area over which object detector 118 can detect objects (e.g., an area in front of the vehicle), and/or interpolate a position of such objects, as described above. Thus, the object detector 118 can detect objects, such as a person 306 and a pole 308, in front of the vehicle 102. Vehicle display system 110 can determine that the person 306 can be obscured by the pole 308, e.g., based on detecting the person 306 and the pole 308 at similar locations, or overlapping locations from a perspective of the front of the vehicle. In any case, vehicle display system 110 can determine to highlight the indicator 302 that is nearest, or associated with a portion of the drawing area 310 (e.g., a quadrant of the lane area) that is nearest, to the person 306. As described, vehicle display system 110 can determine the appropriate indicator 302 by interpolating the location information of the detected person 306 onto the drawing area 310, and determining the indicator 302 associated with the portion of the drawing area 310 nearest to the interpolated location. In addition, the vehicle display system 110 can select a characteristic of the indicator 302 (e.g., a color or pattern) to indicate a characteristic of the object, such as a distance to the object, type of the object (e.g., a different color or pattern for human objects as compared to structural objects), size of the object, acceleration of the object, etc.

Aspects of the present disclosure can be implemented using hardware, software, or a combination thereof and can be implemented in one or more computer systems or other processing systems. In one aspect, the disclosure is directed toward one or more computer systems capable of carrying out the functionality described herein. An example of such a computer system 400 is shown in FIG. 4.

Figure 4:
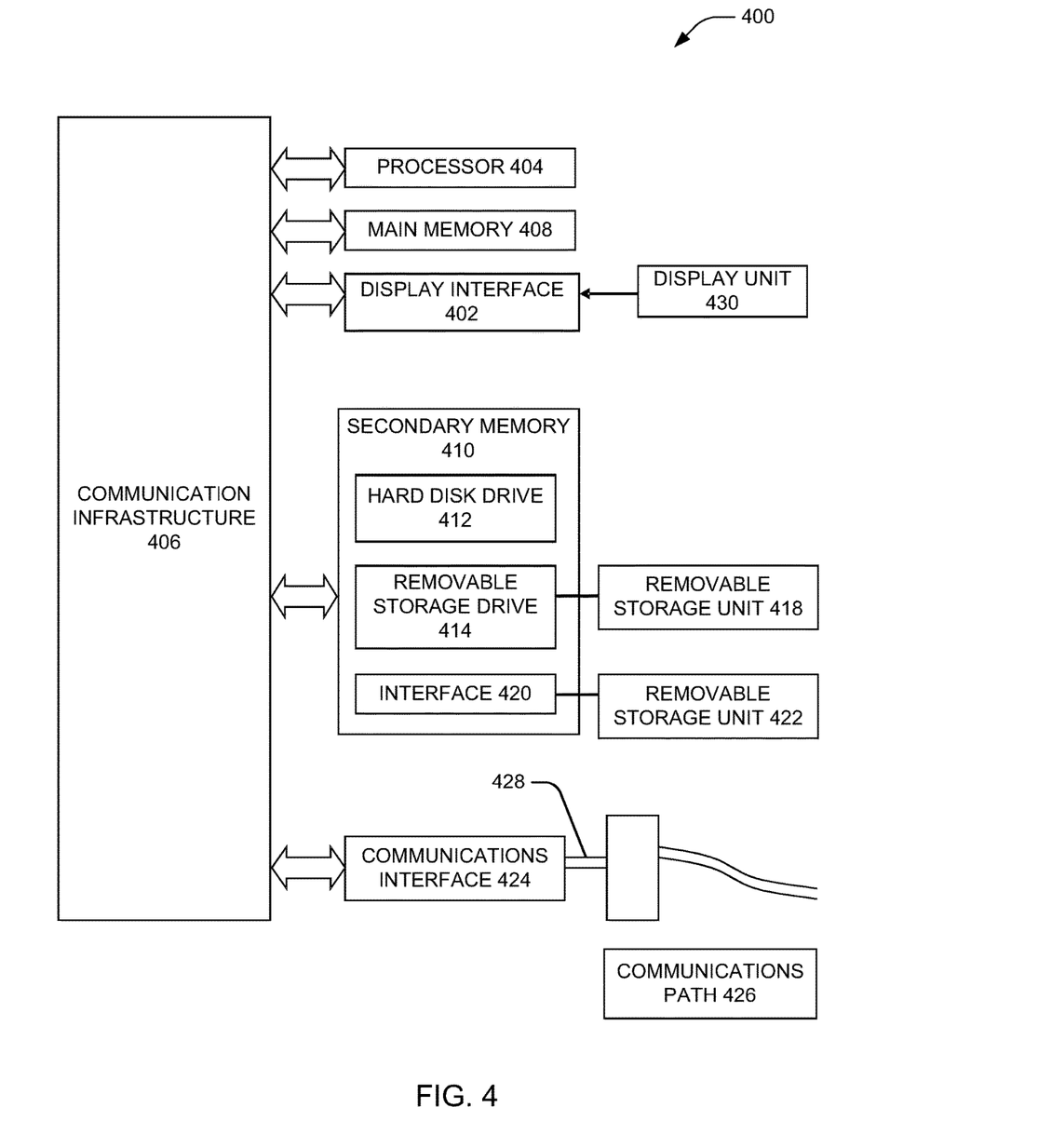
FIG. 4 presents an example system diagram of various hardware components and other features according to one aspect of the disclosure.

FIG. 4 presents an example system diagram of various hardware components and other features, for use in accordance with an aspect of the present disclosure. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system 400 is shown in FIG. 4.

Computer system 400 includes one or more processors, such as processor 404. The processor 404 is connected to a communication infrastructure 406 (e.g., a communications bus, cross-over bar, or network). In one example, processor 120 can include processor 404. Various software aspects are described in terms of this example computer system. After reading this description, it will become apparent to a person skilled in the relevant art(s) how to implement aspects described herein using other computer systems and/or architectures.

Computer system 400 can include a display interface 402 that forwards graphics, text, and other data from the communication infrastructure 406 (or from a frame buffer not shown) for display on a display unit 430. Computer system 400 also includes a main memory 408, preferably random access memory (RAM), and can also include a secondary memory 410. The secondary memory 410 can include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414. As will be appreciated, the removable storage unit 418 includes a computer usable storage medium having stored therein computer software and/or data.

In alternative aspects, secondary memory 410 can include other similar devices for allowing computer programs or other instructions to be loaded into computer system 400. Such devices can include, for example, a removable storage unit 422 and an interface 420. Examples of such can include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400. In an example, memory 122 can include one or more of main memory 408, secondary memory 410, removable storage drive 414, removable storage unit 418, removable storage unit 422, etc.

Computer system 400 can also include a communications interface 424. Communications interface 424 allows software and data to be transferred between computer system 400 and external devices. Examples of communications interface 424 can include a modem, a network interface (such as an Ethernet card), a communications port, a Personal Computer Memory Card International Association (PCMCIA) slot and card, etc. Software and data transferred via communications interface 424 are in the form of signals 428, which can be electronic, electromagnetic, optical or other signals capable of being received by communications interface 424. These signals 428 are provided to communications interface 424 via a communications path (e.g., channel) 426. This path 426 carries signals 428 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 480, a hard disk installed in hard disk drive 470, and signals 428. These computer program products provide software to the computer system 400. Aspects described herein can be directed to such computer program products.

Computer programs (also referred to as computer control logic) are stored in main memory 408 and/or secondary memory 410. Computer programs can also be received via communications interface 424. Such computer programs, when executed, enable the computer system 400 to perform various features in accordance with aspects described herein. In particular, the computer programs, when executed, enable the processor 404 to perform such features. Accordingly, such computer programs represent controllers of the computer system 400.

In variations where aspects described herein are implemented using software, the software can be stored in a computer program product and loaded into computer system 400 using removable storage drive 414, hard disk drive 412, or communications interface 420. The control logic (software), when executed by the processor 404, causes the processor 404 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 5:
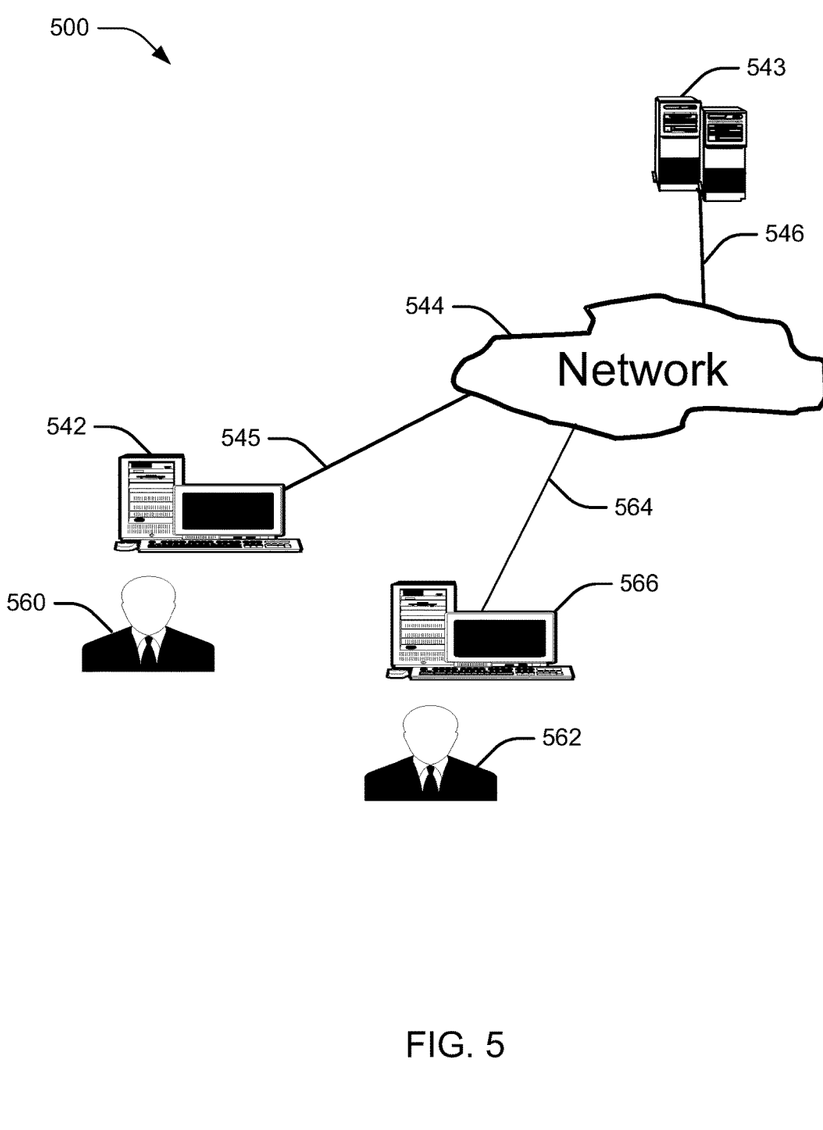
FIG. 5 is a block diagram of various example system components according to one aspect of the disclosure.

FIG. 5 is a block diagram of various example system components, in accordance with an aspect. FIG. 5 shows a communication system 500 usable in accordance with aspects described herein. The communication system 500 includes one or more accessors 560, 562 (also referred to interchangeably herein as one or more "users") and one or more terminals 542, 566. For example, terminals 542, 566 can include vehicle 102 or a related system (e.g., vehicle display system 110, processor 120, communications device 116, etc.), remote device 104, and/or the like. In one aspect, data for use in accordance with aspects described herein is, for example, input and/or accessed by accessors 560, 562 via terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via, for example, a network 544, such as the Internet or an intranet, and couplings 545, 546, 564. The couplings 545, 546, 1464 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method of indicating presence of an object on a display of a vehicle, comprising:
   displaying, on the display of the vehicle, multiple indicators that include, within each of four quadrants of a drawing area associated with the display, one of the multiple indicators at a fixed location within the respective quadrant;
   detecting presence of the object within a travel direction of the vehicle;
   associating location information of the object with one of the four quadrants of the drawing area; and
   highlighting, on the display of the vehicle, an indicator, of the multiple indicators, that corresponds to the one of the four quadrants of the drawing area, as an alert of the presence of the object.

2. The method of claim 1, wherein the display is a heads-up display that projects the multiple indicators in each of the four quadrants of the drawing area onto a windshield of the vehicle.

3. The method of claim 1, wherein detecting the presence of the object is performed by one or more sensors on the vehicle that identify the object and determine the location information of the object with respect to the vehicle.

4. The method of claim 1, wherein associating the location information with the one of the four quadrants of the drawing area comprises interpolating the location information to a position in a coordinate space of the drawing area, and determining the one of the four quadrants of the drawing area corresponding to the interpolated position.

5. The method of claim 1, wherein highlighting the indicator is further based at least in part on determining that the object is obscured by a second object within the travel direction of the vehicle.

6. The method of claim 5, further comprising determining that the object is obscured by the second object based at least in part on comparing a second direction and a second distance of the second object to a direction and a distance of the object.

7. The method of claim 1, wherein highlighting the indicator is further based at least in part on determining that an acceleration of the object achieves a threshold.

8. The method of claim 1, wherein highlighting the indicator comprises selecting at least a characteristic of the highlighting based at least in part on a characteristic of the object.

9. The method of claim 1, wherein the four quadrants correspond to a lane area within the drawing area.

10. A vehicle comprising:
    an electronic control unit for communicating with at least one vehicle system;
    a display for displaying multiple indicators that include, within each of four quadrants of a drawing area associated with the display, one of the multiple indicators at a fixed location within the respective quadrant; and
    at least one processor configured to:
        detect presence of an object within a travel direction of the vehicle;
        associate location information of the object with one of the four quadrants of the drawing area; and
        highlight, on the display of the vehicle, an indicator, of the multiple indicators, that corresponds to the one of the four quadrants of the drawing area, as an alert of the presence of the object.

11. The vehicle of claim 10, wherein the display is a heads-up display that projects the multiple indicators in each of the four quadrants of the drawing area onto a windshield of the vehicle.

12. The vehicle of claim 10, wherein the at least one processor is configured to detect the presence of the object based on one or more sensors on the vehicle that identify the object and determine the location information of the object with respect to the vehicle.

13. The vehicle of claim 10, wherein the at least one processor is configured to associate the location information with the one of the four quadrants of the drawing area at least in part by interpolating the location information to a position in a coordinate space of the drawing area, and determining the one of the four quadrants of the drawing area corresponding to the interpolated position.

14. The vehicle of claim 10, wherein the at least one processor is configured to highlight the indicator further based at least in part on determining that the object is obscured by a second object within the travel direction of the vehicle.

15. The vehicle of claim 14, wherein the at least one processor is further configured to determine that the object is obscured by the second object based at least in part on comparing a second direction and a second distance of the second object to a direction and a distance of the object.

16. The vehicle of claim 10, wherein the at least one processor is configured to highlight the indicator further based at least in part on determining that an acceleration of the object achieves a threshold.

17. The vehicle of claim 10, wherein the at least one processor is configured to highlight the indicator at least in part by selecting at least a characteristic of the highlighting based at least in part on a characteristic of the object.

18. The vehicle of claim 10, wherein the four quadrants correspond to a lane area within the drawing area.

19. A non-transitory computer-readable medium storing computer executable code for indicating presence of an object on a display of a vehicle, comprising code for:
    displaying, on the display of the vehicle, multiple indicators that include, within each of four quadrants of a drawing area associated with the display, one of the multiple indicators at a fixed location within the respective quadrant;
    detecting presence of the object within a travel direction of the vehicle;
    associating location information of the object with one of the four quadrants of the drawing area; and
    highlighting, on the display of the vehicle, an indicator, of the multiple indicators, that corresponds to the one of the four quadrants of the drawing area as an alert of the presence of the object.

20. The non-transitory computer-readable medium of claim 19, wherein the display is a heads-up display that projects the multiple indicators in each of the four quadrants of the drawing area onto a windshield of the vehicle.

* * * * *